(12) United States Patent
Fuechtner

(10) Patent No.: US 8,991,283 B2
(45) Date of Patent: Mar. 31, 2015

(54) DRIVE SYSTEM FOR A MOTOR VEHICLE AND MOTOR VEHICLE HAVING SUCH A DRIVE SYSTEM

(75) Inventor: Martin Fuechtner, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 755 days.

(21) Appl. No.: 13/177,640

(22) Filed: Jul. 7, 2011

(65) Prior Publication Data

US 2012/0006152 A1   Jan. 12, 2012

(30) Foreign Application Priority Data

Jul. 9, 2010   (DE) .................. 10 2010 036 321

(51) Int. Cl.
| | |
|---|---|
| F16H 37/06 | (2006.01) |
| B60K 6/20 | (2007.10) |
| B60W 20/00 | (2006.01) |
| B60K 6/448 | (2007.10) |
| B60K 6/48 | (2007.10) |
| B60K 6/52 | (2007.10) |
| B60W 10/06 | (2006.01) |

(Continued)

(52) U.S. Cl.
CPC . *B60K 6/448* (2013.01); *B60K 6/48* (2013.01); *B60K 6/52* (2013.01); *B60W 10/06* (2013.01); *B60W 10/08* (2013.01); *B60W 10/113* (2013.01); *B60W 20/00* (2013.01); *B60K 6/442* (2013.01); *B60K 2006/4808* (2013.01); *B60K 2006/4825* (2013.01); *B60K 2006/4833* (2013.01); *Y02T 10/6221* (2013.01); *Y02T 10/6243* (2013.01); *Y02T 10/6252* (2013.01); *Y02T 10/626* (2013.01); *Y02T 10/6265* (2013.01); *Y02T 10/6286* (2013.01); *Y02T 10/6234* (2013.01)
USPC ..... 74/661; 74/665 A; 180/65.21; 180/65.285

(58) Field of Classification Search
CPC .......... B60K 6/48; B60K 6/365; B60K 6/442; B60K 6/52; B60K 6/547; B60K 6/40; B60K 6/42; B60K 1/02; B60K 17/344
USPC ........ 74/661, 665 A–665 G; 180/65.1, 65.21, 180/65.235, 65.265, 65.6, 65.8, 65.3, 65.22, 180/65.26, 65.275, 65.285
See application file for complete search history.

(56) References Cited

U.S. PATENT DOCUMENTS

| | | | |
|---|---|---|---|
| 6,524,217 B1 | 2/2003 | Murakami et al. | |
| 6,705,416 B1 * | 3/2004 | Glonner et al. ............ | 180/65.23 |

(Continued)

FOREIGN PATENT DOCUMENTS

| | | | | |
|---|---|---|---|---|
| JP | 10-339182 | 12/1998 | | |
| JP | 2002371942 A | * 12/2002 | .............. | F02N 11/00 |
| JP | 2003-328907 | 11/2003 | | |

*Primary Examiner* — William Kelleher
*Assistant Examiner* — Jake Cook
(74) *Attorney, Agent, or Firm* — Gerald E. Hespos; Michael J. Porco; Matthew T. Hespos

(57) ABSTRACT

A drive system (2) for a motor vehicle (1) has a transmission (11) for driving at least one drive axle (13, 14) of the motor vehicle (1). An internal combustion engine (3) optionally is connected operatively to the transmission (11) or decoupled therefrom. A first electric machine (17) optionally is connected operatively to the at least one drive axle (13, 14) or to an output shaft (39) of the transmission (11) or decoupled therefrom. A second electric machine (19) is connected operatively to the internal combustion engine (3).

9 Claims, 3 Drawing Sheets

(51) Int. Cl.
*B60W 10/08* (2006.01)
*B60W 10/113* (2012.01)
*B60K 6/442* (2007.10)

(56) References Cited

U.S. PATENT DOCUMENTS

| | | | |
|---|---|---|---|
| 6,878,092 B1* | 4/2005 | Schustek et al. | 477/3 |
| 7,051,823 B2* | 5/2006 | Bosch et al. | 180/65.1 |
| 7,367,416 B2* | 5/2008 | Seufert et al. | 180/65.31 |
| 7,543,665 B2* | 6/2009 | Zwilling et al. | 180/65.285 |
| 7,601,086 B2* | 10/2009 | Rosemeier et al. | 475/5 |
| 7,871,348 B2 | 1/2011 | Perkins | |
| 2005/0205312 A1* | 9/2005 | Bosch et al. | 180/65.1 |
| 2009/0118883 A1* | 5/2009 | Heap et al. | 701/22 |
| 2009/0177345 A1* | 7/2009 | Severinsky et al. | 701/22 |
| 2009/0188732 A1 | 7/2009 | Janson | |
| 2009/0197727 A1* | 8/2009 | Janson | 475/5 |
| 2010/0025131 A1* | 2/2010 | Gloceri et al. | 180/65.28 |
| 2010/0065353 A1* | 3/2010 | Hobel | 180/65.22 |
| 2010/0089682 A1* | 4/2010 | Martini et al. | 180/220 |
| 2010/0193269 A1 | 8/2010 | Fuchtner et al. | |
| 2011/0219772 A1 | 9/2011 | Steuernagel et al. | |

* cited by examiner

DRIVE SYSTEM FOR A MOTOR VEHICLE AND MOTOR VEHICLE HAVING SUCH A DRIVE SYSTEM

CROSS REFERENCE TO RELATED APPLICATION

This application claims priority under 35 USC 119 to German Patent Application No 10 2010 036 321.9 filed on Jul. 9, 2010, the entire disclosure of which is incorporated herein by reference.

BACKGROUND OF THE INVENTION

1. Field of the Invention

The invention relates to a drive system for a motor vehicle and to a motor vehicle having such a drive system. The invention can be applied to any motor vehicles, but the invention and the problems on which it is based are explained in more detail with respect to a passenger motor vehicle.

2. Description of the Related Art

A hybrid vehicle generally denotes a vehicle with a drive system that has plural drive units, for example an internal combustion engine and an electric machine. Parallel hybrid drives permit the electric machine and the internal combustion engine to apply a torque to a transmission either alternatively or cumulatively and are used to generate an energetic efficiency level that is as high as possible. The electric machine also can be used as a generator, i.e. during the braking of the vehicle. Thus, the braking energy of the vehicle, which is present in the form of kinetic energy, can be recovered and used, for example, to charge electric energy stores. Frequent starting processes and acceleration processes that occur, for example, in urban traffic, preferably are carried out or assisted by the electric machine in a hybrid motor vehicle since the operation of the internal combustion engine with frequent load changes results in increased fuel consumption and emissions of pollutants.

The electric machine also is assigned the task of starting the internal combustion engine. In this context, both reliable warm starting, for example restarting after the internal combustion engine has been switched off for a brief time, and reliable cold starting of the internal combustion engine must be ensured.

JP 2003328907 A describes a drive system for a hybrid vehicle having an internal combustion engine, a belt starter generator connected to the crankshaft of the internal combustion engine and a pinion starter that can be connected to a starter ring gear of the internal combustion engine. The belt starter generator reliably permits the internal combustion engine to start from the warm state, and the belt drive allows a generator mode of the belt starter generator over a wide range of rotational speeds of the internal combustion engine. The pinion starter can provide a significantly larger torque than the belt starter generator and reliably ensures cold starting of the internal combustion engine. However, the direct connection of the belt starter generator to the internal combustion engine disadvantageously makes it possible to drive the vehicle axles solely with the belt starter generator only if the internal combustion engine is entrained. Thus, friction losses increase. Decoupling the internal combustion engine also is impossible during the conversion of kinetic energy of the hybrid vehicle into electric energy by means of the belt starter generator. As a result, the internal combustion engine also generates drag torques and friction losses during the conversion of braking energy.

The invention therefore is based on the object of providing an improved drive system that eliminates the abovementioned disadvantages.

SUMMARY OF THE INVENTION

A drive system for a motor vehicle in accordance with the invention has a transmission for driving at least one drive axle of the motor vehicle. An internal combustion engine optionally is connected operatively to the transmission or decoupled therefrom. A first electric machine optionally is connected operatively to the at least one drive axle or to an output shaft of the transmission or decoupled therefrom. Additionally, a second electric machine which is connected operatively to the internal combustion engine.

The invention also relates to a motor vehicle having such a drive system.

The first electric machine is connected operatively to the at least one drive axle or to the drive axle of the transmission and is not connected operatively directly to the internal combustion engine. Thus, torque can be fed into the drive system or to operate the first electric machine as a generator without the internal combustion engine generating drag torques and/or friction losses.

The drive system preferably has a third electric machine that is embodied as a starter for starting the internal combustion engine and that optionally is connected operatively to the internal combustion engine or decoupled therefrom. As a result, reliable cold starting of the internal combustion engine is ensured, thereby increasing the operational reliability of the drive system.

The starter may be connected operatively to the internal combustion engine or decoupled therefrom by means of a disengageable pinion designed to engage in a starter ring gear of the internal combustion engine. This positively locking connection enables a high starting torque to be transmitted for cold starting the internal combustion engine.

The second electric machine may be a belt starter generator operatively connected to a crankshaft of the internal combustion engine by a belt drive to provide an oscillation-damping quiet operative connection between the second electric machine and the crankshaft. The belt drive can achieve an advantageous transmission ratio between the crankshaft and the second electric machine, and the second electric machine can be used as a generator even at high rotational speeds of the internal combustion engine.

The transmission may be a double-clutch transmission, and the internal combustion engine optionally can be connected operatively to the double-clutch transmission or decoupled therefrom by means of a double clutch. Thus, the torque of the internal combustion engine can be transmitted to the at least one drive axle without interruption in the tractive force, thereby advantageously increasing the acceleration capability of a motor vehicle with such a drive system.

The drive system may have a first drive axle embodied as a front axle and a second drive axle embodied as a rear axle. The first electric machine optionally may be connected operatively to the front axle or decoupled therefrom. Thus, the front axle additionally can be driven if the internal combustion engine only transmits a drive torque to the rear axle.

The first electric machine may be an axial module that optionally is connected operatively to the at least one drive axle or decoupled therefrom by axial gearing. As a result, the first electric machine advantageously can be integrated into the axial gearing to reduce space requirements for the first electric machine and therefore for the drive system.

The first electric machine may have a first clutch device for decoupling the first electric machine from the at least one drive axle or from the output shaft of the transmission. Thus, continuous concurrent running of the first electric machine is prevented and friction losses are avoided.

The first and/or the second electric machine may be embodied both for generator mode operation and electric motor mode operation. Thus, each electric machine advantageously can feed a torque into the drive system and can generate electrical energy for charging an energy store.

The invention will be explained in more detail below on the basis of the exemplary embodiments and with reference to the appended schematic drawings.

DETAILED DESCRIPTION OF THE PREFERRED EMBODIMENTS

Figure 1:
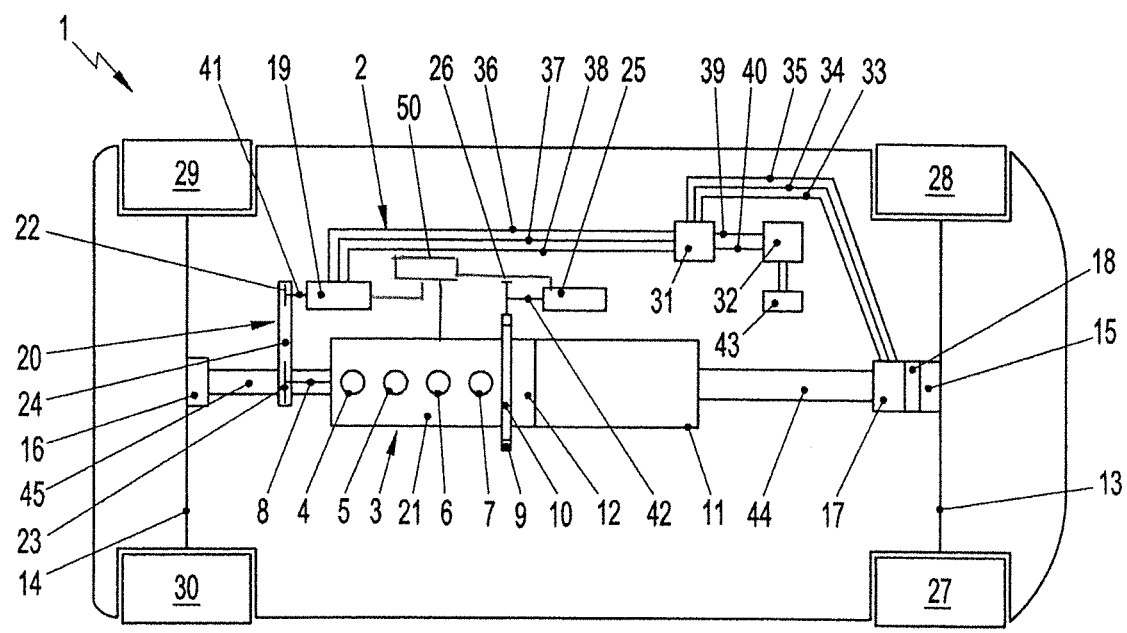
FIG. 1 shows a plan view of a drive system according to a preferred embodiment of the present invention.

In the figures of the drawing, the same reference symbols denote identical or functionally identical components, unless otherwise stated.

Figure 2:
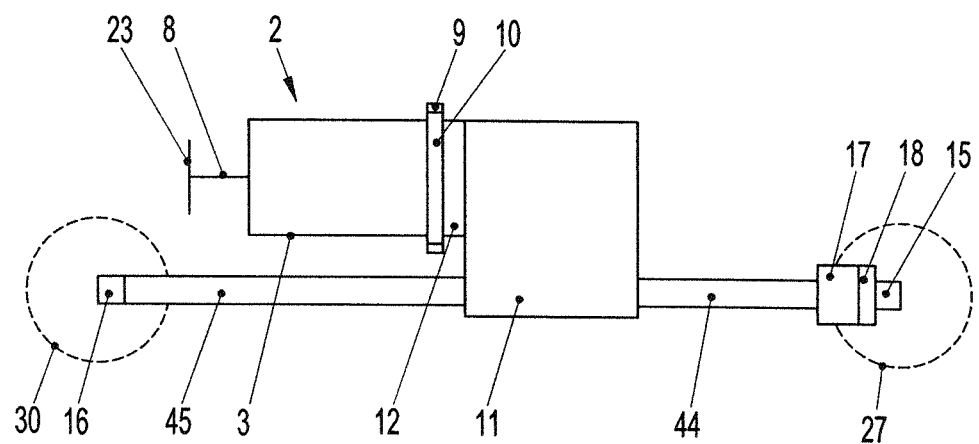
FIG. 2 shows a side view of the drive system of the preferred embodiment of the drive system according to FIG. 1.

FIGS. 1 to 2 illustrate a motor vehicle 1 with a preferred embodiment of a drive system 2. The drive system 2 preferably has an internal combustion engine 3. The internal combustion engine 3 has, for example four cylinders 4-7. Four cylinders is optional and the internal combustion engine 3 can have more or fewer cylinders. The internal combustion engine 3 also has a crankshaft 8 and a starter ring gear 9, which is provided, for example, on a flywheel 10 of the internal combustion engine 3. The flywheel 10 preferably is mounted fixedly on the crankshaft 8. The internal combustion engine 3 has a housing, which is essentially in the shape of a right parallelepiped, and the crankshaft 8 passes through, for example, the entire length of the housing 21. The flywheel 10 is arranged, for example, on a narrow side of the housing 21.

The drive system 2 has a transmission 11, which preferably is a double-clutch transmission 11. The transmission 11 can be connected operatively to the crankshaft 8 of the internal combustion engine 3 via a clutch device 12, and preferably a double clutch 12. The double clutch 12 has a clutch housing (not shown) that is connected to the crankshaft 8 to rotate therewith. Two clutch disks each are connected to a transmission input shaft of the double-clutch transmission 11 to rotate therewith and optionally can be connected operatively to the clutch housing in a nonpositively locking fashion. Hence, the internal combustion engine 3 optionally is connected operatively to the transmission 11 or is decoupled therefrom by the double clutch 12. The transmission 11 functions to drive at least one drive axle 13, 14 of the motor vehicle 1. The drive system 2 preferably is a mechanical all-wheel drive. Thus, for example, the rear axle 14 of the motor vehicle 1 is driven continuously and the front drive axle 13 is driven optionally. For this purpose, the transmission 11 preferably has a power divider that makes it possible to drive only the rear axle 14 or to drive the front axle 13 and the rear axle 14 together. Switching between these two operating states is carried out manually by a vehicle driver or automatically by a corresponding closed-loop/open-loop control device that assesses the driving state of the motor vehicle 1 and controls the distribution of the drive torque of the internal combustion engine 3 between the drive axles 13, 14. The drive system 2 also has front axle gearing 15 or a front differential 15 and rear axle gearing 16, or a rear differential 16 that function respectively to distribute the drive torque applied to the respective drive axle 13, 14 among tires 27-30 of the motor vehicle 1. The front axle gearing 15 and the rear axle gearing 16 preferably are connected operatively to the transmission 11 via front and rear transmission output shafts 44, 45.

The motor vehicle 1 has a first electric machine 17. The first electric machine 17 preferably can be operated either as a generator or as an electric motor and preferably is an axial module 17 that is connected operatively to the front axle 13 or decoupled therefrom by the front axle gearing 15. The first electric machine 17 preferably is integrated into the front axle gearing 15 and a first clutch device 18 permits the first electric machine 17 to be connected operatively to the front axle 13 or decoupled therefrom. The first clutch device 18 preferably is a friction clutch or a dog clutch. The first electric machine 17 preferably is a high-voltage electric machine.

A second electric machine 19 is connected operatively to the crankshaft 8 of the internal combustion engine 3. The second electric machine 19 preferably is a belt starter generator 19 and is connected operatively to the crankshaft 8 of the internal combustion engine 3 by a belt drive 20. The belt drive 20 has a first belt pulley 22 on a drive shaft 41 of the belt starter generator 19 to rotate therewith, a second belt pulley 23 on the crankshaft 8 to rotate therewith, and a drive belt 24. The drive belt 24 preferably is a V belt or a V ribbed belt and allows a torque to be transmitted in a frictionally locking fashion from the first belt pulley 22 to the second belt pulley 23, or vice versa. The transmission ratio of the belt drive 20 is configured so that the belt starter generator 19 can be operated as a generator over the entire rotational speed range of the internal combustion engine 3, and so that the internal combustion engine 3 can be started with the same transmission ratio of the belt drive 20. The belt drive 20 constitutes an oscillation-damping operative connection between the crankshaft 8 and the output shaft 41. The second electric machine 19 also preferably is a high-voltage electric machine.

The drive system 2 also may have a third electric machine 25 that preferably is a starter 25 for starting the internal combustion engine 3. The starter 25 optionally is connected operatively to the internal combustion engine 3 or decoupled therefrom. For this purpose, the starter 25 has a disengageable starter pinion 26 arranged on an output shaft 42 of the starter 25 for rotation therewith and is engageable in the starter ring gear 9 of the internal combustion engine 3. The starter pinion 26 preferably can be moved along the output shaft 42 by an activation device of the starter 25, and therefore can be engaged in the starter ring gear 9 to start the internal combustion engine 3, and can be disengaged from the starter ring gear 9 after the internal combustion engine 3 has started. The starter pinion 26 and the starter ring gear 9 permit a torque to be transmitted in a positively locking fashion from the output shaft 42 to the crankshaft 8. A corresponding transmission ratio, which preferably differs from the transmission ratio of the belt drive 20, between the starter pinion 26 and the starter ring gear 9 permits a particularly high starting torque to be transmitted. The starter 25 is suitable for cold starting the internal combustion engine 3 and also preferably is designed for electric motor mode operation.

The drive system 2 also has power electronics 31 and an energy store 32, preferably in the form of a battery 32. The power electronics 31 are connected to the battery 32 via cable connections 39, 40. The power electronics 31 are connected to the first electric machine 17 via cable connections 33-35, and to the second electric machine 19 via cable connections 36-38. The power electronics 31 can also be connected to the starter 25 via corresponding cable connections. The first and second electric machines 17, 19 preferably form a high-voltage circuit with the cable connections 33-38 and the power electronics 31. The cable connections 33-40 each serve to transmit electrical energy and/or data and/or control signals. An electric consumer 43, for example a compressor of an air conditioning system or an oil pump is coupled, for example, to the battery 32.

Figure 3:
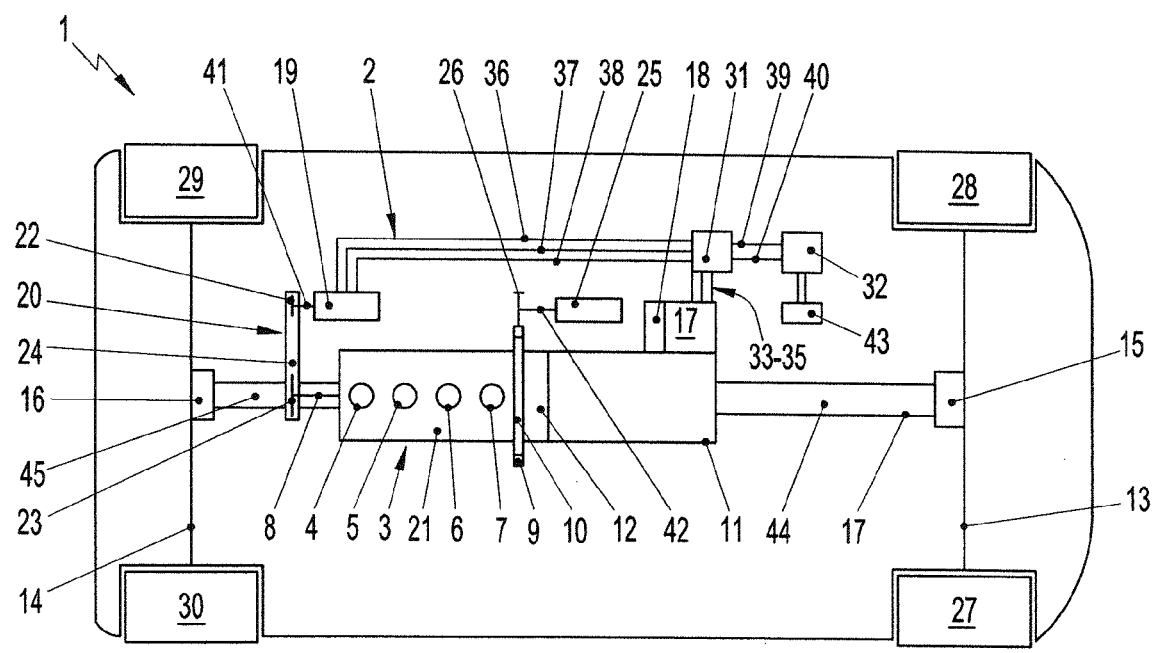
FIG. 3 shows a plan view of a drive system according to a further preferred embodiment of the present invention.

FIG. 3 shows a motor vehicle 1 with an alternate embodiment of the drive system 2. The drive system 2 of FIG. 23 differs from the drive system 2 of FIGS. 1 and 2 only in the method of coupling the first electric machine 17. The first electric machine 17 is not capable of being connected to the front axle 13, but instead is connected operatively to one or both of the transmission output shafts 44, 45 or decoupled therefrom. The first electric machine 17 preferably is integrated into the transmission 11 and the first clutch device 18 functions to connect or decouple the first electric machine 17 to or from the transmission output shaft 44, 45 of the double-clutch transmission 11. The first electric machine 17 can be connected to the transmission output shaft 44, 45, for example, by a gear mechanism or a belt drive. The first electric machine 17 preferably can be connected operatively to the transmission output shaft 44, 45 so that a torque generated by the first electric machine 17 is transmitted to the front axle 13.

The method of functioning of the drive system 2 of FIGS. 1 to 3 is explained below. Either the belt starter generator 19 or the starter 25 can be used to start the internal combustion engine 3. The positively locking operative connection of the starter 25 to the crankshaft 8 of the internal combustion engine 3 functions for cold starting the internal combustion engine 3, while the belt starter generator 19 preferably is used for warm starting of the internal combustion engine 3. The starter 25 advantageously can be used in large-volume internal combustion engines. Whether the starter 25 or the belt starter generator 19 is used to start the internal combustion engine 3 can be determined, for example, by a corresponding control device 30 that determines, for example, the temperature level of the internal combustion engine 3 and then correspondingly actuates the starter 25 or the belt starter generator 19. In an alternative embodiment of the drive system 2, the internal combustion engine 3 is started exclusively with the belt starter generator 19. During operation of the internal combustion engine 3, the third electric machine 25 is decoupled from the internal combustion engine 3. For this purpose, the starter pinion 26 is disengaged from the starter ring gear 9. The belt starter generator 19 runs concurrently with the internal combustion engine 3 via the belt drive 20.

The internal combustion engine 3 either is decoupled from the transmission 11 or operatively connected thereto through corresponding activation of the clutch device 12. In the decoupled state, the internal combustion engine 3 can functions to drive the belt starter generator 19 in generator mode so that the belt starter generator 19 can be used, for example, to carry out stationary charging of the energy store 32. For this purpose, electrical energy generated by the belt starter generator 19 is fed into the battery 32 by the power electronics 31. Therefore, even in the stationary mode of the motor vehicle 1 the consumer 43 reliably is prevented from completely discharging the battery 32.

In the driving mode of a motor vehicle 1, the crankshaft 8 of the internal combustion engine 3 is connected operatively to the transmission 11 by the clutch device 12. A drive torque of the internal combustion engine 3 is transmitted to the drive axles 13, 14 via the transmission 11, the transmission output shafts 44, 45 and the axial gearing 15, 16. The transmission 11, for example, can be shifted so that the internal combustion engine merely transmits a drive torque to the rear axle 14. The belt starter generator 19 is driven by the internal combustion engine 3 as a generator to charge the battery 32 or operates as an electric motor and therefore applies an additional torque to the crankshaft 8 of the internal combustion engine 3, depending on the driving state of the motor vehicle 1. An additional torque also can be fed into the drive system 2 by the first electric machine 17. For this purpose, the first clutch device 18 is shifted so that the first electric machine 17 is connected to the front axle 13 or to the output shaft 44, 45 of the transmission 11.

Therefore, the front axle 13 can be driven by the electric motor and the rear axle 14 can be driven by the internal combustion engine.

By opening the clutch device 12, the internal combustion engine 3 is disconnected from the transmission 11, and it is possible to drive the drive system 2 solely by the first electric machine 17. The motor vehicle 1 therefore can be moved exclusively by the first electric machine 17. Hence, the internal combustion engine 3 is decoupled from the drive system 2 and therefore generates neither drag torques nor friction losses. In this operating state, the internal combustion engine 3 can either be switched off or can be used to charge the battery 32. In the regenerative mode of the drive system 2, i.e. when movement energy of the motor vehicle 1 is being recovered, it is also possible for the entire movement energy to be converted into electrical energy exclusively by the first electric machine 17. If the braking effect of the first electric machine 17 is not sufficient, the internal combustion engine 3 and the second electric machine 19, which is also operating in the generator mode, are connected up by correspondingly shifting the clutch device 12.

The drive system 2 according to FIGS. 1 to 3 therefore advantageously permits both reliable warm and cold starting of the internal combustion engine 3, stationary charging of the battery 32, operation of the motor vehicle 1 in a purely electric motor mode as well as in a cumulative electric motor mode/internal combustion engine mode, and recovery of kinetic energy of the motor vehicle 1. Furthermore, the described drive system 2 can be used to transmit the power of the internal combustion engine 3 to the belt starter generator 19 in order to charge the battery 32 during highly dynamic travel of the motor vehicle 1, for example at an apex point of a bend which is being travelled through, at which apex point a maximum lateral force but no longitudinal force can be transmitted to a tire 27-30, and therefore it is also impossible to use the power of the internal combustion engine 3 to move the motor vehicle 1 forward at this apex point. After the vehicle has exited the apex point of the bend, this stored energy can be used in turn to accelerate out of the bend by means of the two electric machines 17, 19. This so-called apex point charging therefore permits the time component of the use of the internal combustion engine 3 to be increased.

What is claimed is:

1. A drive system for a motor vehicle, having: a transmission for driving at least one drive axle of the motor vehicle; an internal combustion engine that is selectively connected to the transmission or decoupled therefrom, the internal combustion engine having a crankshaft and a starter ring gear; a first electric machine that is selectively connected to the at least one drive axle or to an output shaft of the transmission or decoupled therefrom, the first electric machine further being configured to operate as a motor and as a generator; a second electric machine that is connected to the crankshaft of the internal combustion engine by a belt drive, the second electric machine being configured to operate as a starter for warm starting of the internal combustion engine and as a generator; and a third electric machine having a pinion that is selectively connected to the starter ring gear for cold starting of the internal combustion engine.

2. The drive system of claim 1, wherein the transmission is a double-clutch transmission, the internal combustion engine being selectively connected to the double-clutch transmission or decoupled therefrom by a double clutch.

3. The drive system of claim 1, wherein the drive system has a front axle and a rear axle, the first electric machine being selectively connected to the front axle or decoupled therefrom.

4. The drive system of claim 1, wherein the first electric machine is an axial module that is selectively connected to the at least one drive axle or decoupled therefrom by means of axial gearing.

5. The drive system of claim 1, wherein the first electric machine has a first clutch device for decoupling the first electric machine from the at least one drive axle or from an output shaft of the transmission.

6. The drive system of claim 1, further comprising a control device that determines a temperature level of the internal combustion engine and then correspondingly actuates the second or third electric machine based on the determined temperature level of the internal combustion engine.

7. A motor vehicle, comprising: a front axle and a rear axle; a transmission for driving at least one of the front and rear axles; an internal combustion engine that is selectively connected to the transmission or decoupled therefrom, the internal combustion engine having a crankshaft and a starter ring gear; a first electric machine that is selectively connected to at least one of the front and rear axles or to an output shaft of the transmission or decoupled therefrom, the first electric machine further being configured to operate as a motor and as a generator; a second electric machine that is connected to the crankshaft of the internal combustion engine by a belt drive, the second electric machine being configured to operate as a starter for warm starting of the internal combustion engine and as a generator; and a third electric machine having a pinion that is selectively connected to the starter ring gear for cold starting of the internal combustion engine.

8. The drive system of claim 7, further comprising a control device for determining whether conditions of the internal combustion engine are appropriate for a warm start by the second electric machine or a cold start by the third electric machine.

9. The drive system of claim 8, further comprising a battery connected to power electronics.

* * * * *